May 28, 1940.  G. E. BARNHART  2,201,977
MECHANICAL MOVEMENT
Filed June 21, 1938  2 Sheets-Sheet 1
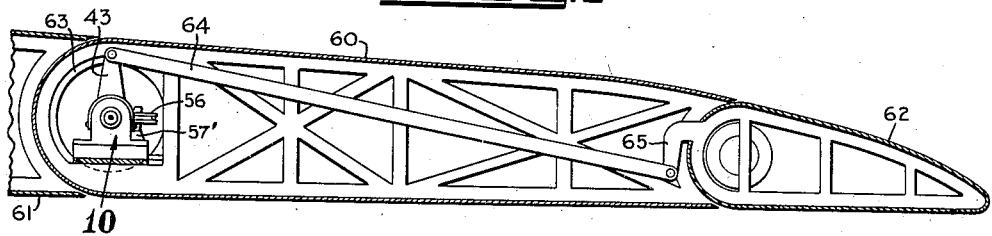
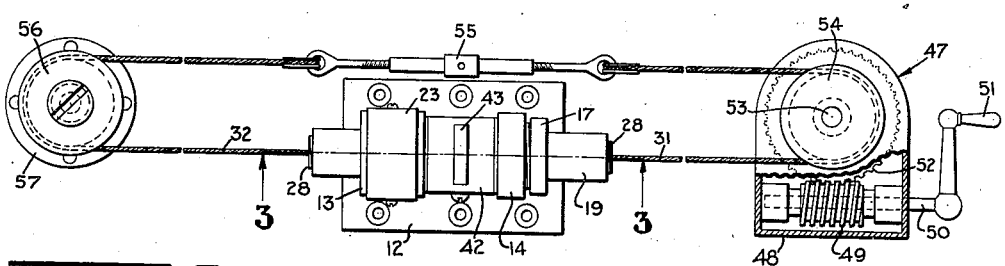
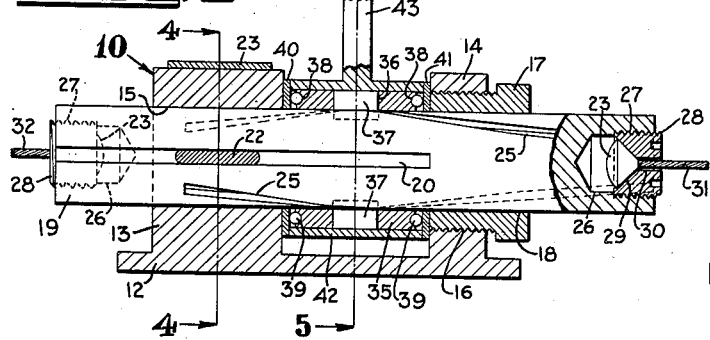
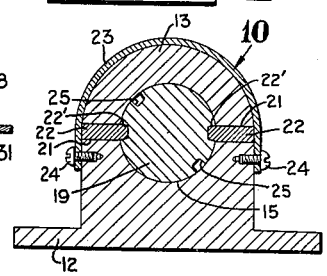
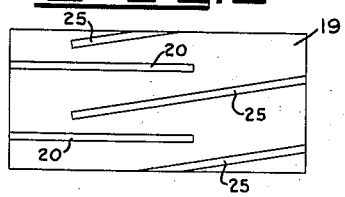
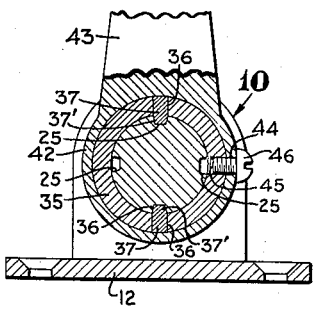
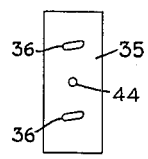
INVENTOR.
George E. Barnhart.
BY
ATTORNEY.

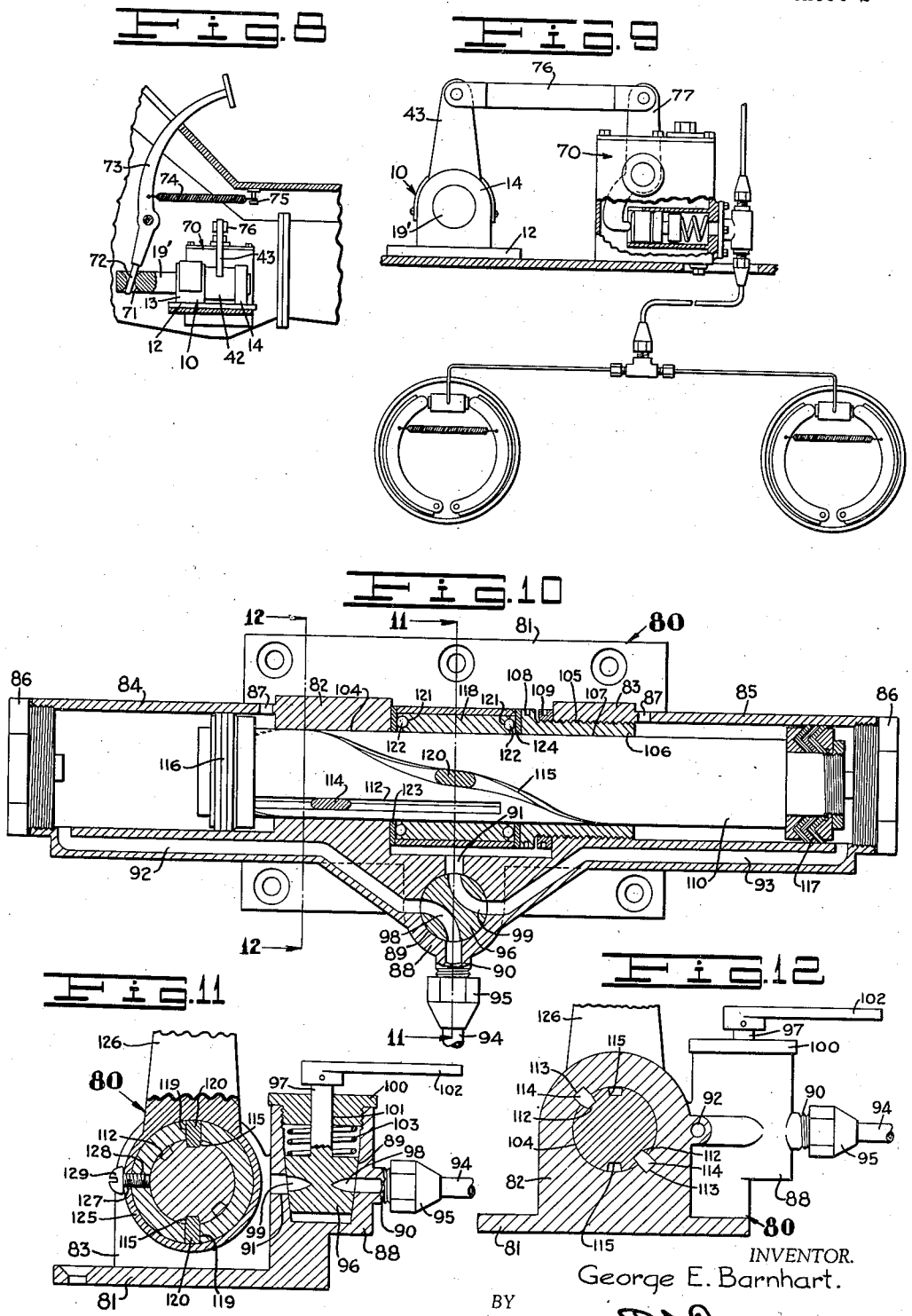
May 28, 1940.  G. E. BARNHART  2,201,977
MECHANICAL MOVEMENT
Filed June 21, 1938  2 Sheets-Sheet 2
INVENTOR.
George E. Barnhart.
BY
ATTORNEY.

Patented May 28, 1940

2,201,977

UNITED STATES PATENT OFFICE 2,201,977

MECHANICAL MOVEMENT

George E. Barnhart, Pasadena, Calif.

Application June 21, 1938, Serial No. 214,894

3 Claims. (Cl. 74—107)

This invention relates to improvements in mechanical operating members and means for actuating the same.

The general object of the invention is to provide an improved mechanical operating member applicable in many ways for actuating various devices.

Another object of the invention is to provide an improved mechanical operating member and an actuating member for the same wherein the operating member is non-reversible unless reversed by the actuating member.

A further object of the invention is to provide a mechanical operating member and a remote control member or actuating member for the same wherein back lash on the operating member is not transmitted to the actuating member.

A more specific object of my invention is to provide a novel airplane control device.

Another object of the invention is to provide a novel brake control device.

An additional object of my invention is to provide a brake wherein the brake is applied and locked until the operator releases the braking pressure and wherein the operator merely holds the braking member and is not required to continually apply a braking pressure.

Other objects and the advantages of this invention will be apparent from the following description taken in connection with the accompanying drawings, wherein:

Fig. 1 is a fragmentary section through the wing of an airplane at an aileron station showing my improved operating member operatively installed in the aileron to operate the balance flipper thereof;

Fig. 2 is an enlarged top plan view of the operating member shown in Fig. 1 showing it operatively connected to an actuating member;

Fig. 3 is an enlarged section taken on line 3—3 of Fig. 2;

Fig. 4 is a section taken on line 4—4 of Fig. 3;

Fig. 5 is a section taken on line 5—5 of Fig. 3;

Fig. 6 is a diagrammatic development on a reduced scale of the outer surface of the reciprocating rod;

Fig. 7 is a diagrammatic development on a reduced scale of the interior surface of the sleeve member;

Fig. 8 is a side elevation of my improved mechanical operating member showing it installed to actuate the master control device of a hydraulic braking system;

Fig. 9 is an enlarged view of the mechanical operating member shown in Fig. 8 and schematically shows a hydraulic braking system;

Fig 10 is a top plan view, partly in section, through a modified form of operating member;

Fig. 11 is a section taken on line 11—11 of Fig. 10; and

Fig. 12 is a section taken on line 12—12 of Fig. 10.

Referring to the drawings by reference characters I have indicated my improved operating member generally at 10. As shown the device 10 includes a base portion 12 having upstanding spaced boss portions 13 and 14 thereon. The boss 13 has a horizontal bore 15 therein and the boss 14 has a threaded aperture 16 therein which is coaxial with the bore 15.

Positioned in the threaded aperture 16 I provide an externally threaded plug 17 which has a bore 18 coaxial with the bore 15 and of the same size. Positioned in the bores 15 and 18 I provide a rod 19. In the outer surface thereof the rod 19 has a pair of opposed straight spline keyways 20.

The boss 13 has a pair of opposed slots 21 therein in each of which a spline member 22 having a tapered end 22' is positioned which extends into its associated keyway 20 in the rod 19 to prevent rotation of the rod. The spline members 22 are shown as retained in position in the boss 13 by a plate member 23 which is secured to the boss by screws 24.

The rod 19 further includes a pair of opposed spiral spline keyways 25. In each end thereof the rod 19 has a recess 26 a portion of which is threaded as at 27. Positioned in each of the threaded recesses 27 I provide an externally threaded plug 28. Each of the plugs 28 has a tapered recess 29 in the inner face thereof and a reduced aperture 30 opening into the tapered recess. A flexible steel cord 31 is positioned in the aperture 30 of one of the plugs 28 and a similar cord 32 is positioned in the aperture of the other plug 28. Each of the cords 31 and 32 includes an enlarged anchor or head portion 33 which is positioned in the tapered recess 29 of its associated plug member 28.

Surrounding the rod 19 between the bosses 13 and 14 I provide a sleeve member 35 which intermediate its length has a pair of opposed spline slots 36 therein which are arranged at an angle to correspond to the pitch of the spiral keyways 25 in the rod 19. Positioned in the spline slots 36 I provide spline members 37 which extend into the spiral keyways 25 of the rod 19 and which have tapered ends 37'. Each end face of the sleeve 35 has a circular ball race groove 38 therein in which are positioned a plurality of anti-friction balls 39.

Surrounding the rod 19 between the boss 13 and the adjacent end of the sleeve 35 I provide a plate 40 which the anti-friction balls 39 at that end of the sleeve engage. Surrounding the rod 19 between the boss 14 and the adjacent end of the sleeve I provide a plate 41 which the anti-friction balls 39 at that end of the sleeve engage. The opposite face of the plate 41 is engaged by the inner end of the plug 17 which may be tightened to maintain the correct pressure on the anti-friction balls 39 at all times.

Surrounding the sleeve 35 I provide a cylindrical housing 42 which has an operating arm 43 protruding therefrom. The housing 42 has an aperture 44 therein and the sleeve 35 has an aligned threaded aperture 45 therein. A screw 46 is positioned in the housing aperture 44 and in the threaded sleeve aperture 45, to secure the sleeve and housing together.

From the foregoing it will be apparent that when the rod 19 is reciprocated the spiral keyways 25, together with the splines 37 will rotate the sleeve 35 and the housing 42 about the axis of the rod 19. The inclination of the spline keyways is such that the parts remain in the set position and only by moving the rod 19 can the sleeve 35 be rotated.

For reciprocating the rod 19 I provide an actuator which is indicated generally at 47. As shown the actuator 47 includes a housing 48 having a worm pinion 49 positioned therein which is mounted on a shaft 50 which extends out of the housing where it is adapted to be rotated as by a crank handle 51 thereon. A worm gear 52 within the housing 48 meshes with the worm pinion 49. The worm gear 52 is mounted on a vertical shaft 53 which extends upwardly out of the housing where it has a pulley 54 thereon.

The flexible steel cord 31 extends over the pulley 54 and the end thereof opposite the head portion 33 is suitably secured to one end of a turnbuckle member 55. The flexible steel cord 32 extends over a pulley 56 which is rotatably mounted on a support 57. The end of the cord 32 opposite its head member 33 is suitably secured to the end of the turnbuckle 55 opposite the cord 31.

To move the rod 19 of the device 10 an operator turns the handle 51 of the actuator 47. As the handle 51 is turned it rotates the worm pinion 49 which in turn rotates the worm gear 52, the shaft 53 and the pulley 54 which in turn pulls the flexible steel cord 31 in one direction or the other depending in which direction the handle 51 is rotated.

In Fig. 1 I have shown the device 10 as operatively mounted in an aileron 60 of an airplane wing 61 for actuating an aileron balance flap 62. When thus used the operating member 10 is mounted in the aileron with the axis of the rod 19 substantially in line with the axis of the aileron pivot 63 which is hollow and through which the flexible cable 31 may enter the aileron. The flexible cable 31 preferably extends to the pilot's compartment of the airplane where the actuator 47 is preferably located. The operating arm 43 of the device 10 is connected by a link 64 to the operating arm 65 of the flap 62.

Thus when the device 10 is actuated to rotate the housing 42 thereof as previously described the operating arm 43 of the device 10 will through the medium of the link 64 and arm 65 move the flap 62.

In Figs. 8 and 9 I have shown the device 10 as adapted to operate the master control device 70 of a hydraulic braking system of an automobile. When thus used the rod 19 of the device 10 is replaced by a similarly spline grooved rod 19' which adjacent one end thereof has a slot 71 therein in which a reduced portion 72 of the foot brake lever 73 is positioned. A coiled spring 74 having one end suitably anchored as at 75 and the opposite end connected to the brake lever 73 resiliently urges the brake lever 73 to a position wherein it moves the rod 19' to an extended position.

The operating arm 43 of the device 10 is connected by a suitable link 76 to the operating arm 77 of the master brake control device 70. When the brake lever 73 is depressed in the usual manner to apply the brakes the portion 72 forces the rod 19' of the device 10 inward whereupon the operating arm 43 swings about the axis of the rod as previously described. As the operating arm 43 of the device 10 is thus moved it in turn through the link 76 moves the operating arm 77 of the master brake control device 70 to apply the brakes. After the brakes have been applied the only pressure necessary on the foot lever 73 to maintain them applied is that required to overcome the tension of the spring 74. When pressure is removed from the foot lever 73 the spring again moves the lever 73 to a position wherein the rod 19' is in an extended position as shown in Fig. 8. As the rod 19' is thus moved it will, as previously described, move the operating arm 43 which through the link 76 will move the operating arm 77 of the master brake control device 70 to release the brakes.

In Figs. 10, 11 and 12 I have indicated a modified form of operating member generally at 80. As shown the device 80 includes a base 81 having upstanding spaced boss portions 82 and 83 thereon. The boss 82 includes an outwardly extending cylinder portion 84 and the boss 83 includes a similar cylinder portion 85. The outer ends of the cylinders 84 and 85 are each shown as closed by a threaded plug member 86. Each of the cylinders 84 and 85 adjacent their associated bosses has a bleed aperture 87 in the side wall thereof.

Intermediate the bosses 84 and 85 and at one side thereof the boss 81 includes an upstanding valve boss 88 which has an open topped tapered plug valve recess 69 therein. The valve boss 88 includes an outwardly extending inlet portion 90 and directly opposite an exhaust port 91. One end of a conduit 92 opens into the valve recess 89 at right angles to the inlet 90 and the opposite end opens into the cylinder 84 adjacent the outer end thereof. One end of a conduit 93 opens into the valve recess 89 opposite the conduit 92 and the opposite end opens into the cylinder 84 adjacent the outer end thereof.

Air or other fluid under pressure is directed to the inlet 90 by a conduit 94 one end of which is connected to the inlet 90 by a suitable coupling member 95 and the opposite end communicates with a suitable source of supply not shown.

Positioned in the valve recess 89 I provide a tapered plug valve 96 which includes a valve stem 97. The plug valve 96 has spaced ports 98 and 99 therein the opposite ends of which open through the side walls at right angles. In one position of the plug valve 96 the port 98 communicates with the inlet 90 and the conduit 92 and the port 99 communicates with the exhaust port 91 and the conduit 93. In the other position of the plug valve 96 the valve port 99 communicates with the inlet 90 and with the conduit 93 and the port 98 communicates with the outlet port 91 and the conduit 92.

The upper end of the valve recess 89 is closed by a threaded plug 100 having an aperture 101 therein in which the valve stem 97 is positioned. The valve stem 97 is preferably provided with an operating handle 102. A coiled spring 103 surrounding the valve stem 97 between the plug valve 96 and the closure plug 100 firmly seats the valve in the recess 89.

The boss 82 has a horizontal bore 104 therein and the boss 83 has a threaded aperture 105 therein which is coaxial with the bore 104.

Positioned in the threaded aperture 105 I provide an externally threaded plug 106 which has a coaxial bore 107 therein of the same diameter as the bore 104 and includes an enlarged head portion 108. Mounted on the threaded plug 107 between the head thereof and the adjacent end of the boss 83 I provide a lock nut 109.

Positioned in the bores 104 and 107 I provide a rod 110 which in the outer surface thereof has a pair of opposed spline keyways 112. The boss 82 has a pair of opposed key slots 113 therein in each of which a spline member 114 is positioned and extends into its associated keyway 112 in the rod 110 to prevent rotation of the rod.

The rod member 110 further includes a pair of spiral spline keyways 115 similar to the keyways 25. At one end the rod 110 extends into the cylinder 83 and the opposite end extends into the cylinder 85. Within the cylinder 84 the rod 110 includes a packed piston head 116 and in the cylinder 85 the rod includes a similar piston head 117.

Surrounding the rod 110 between the bosses 82 and 83 I provide a sleeve member 118. Intermediate the length thereof the sleeve 118 has a pair of opposed spline slots 119 therein which are arranged at an angle to correspond to the pitch of the spiral keyways 115 in the rod 110. Positioned in the spline slots 119 I provide spline members 120 which extend into the spiral keyways 119 of the rod 110.

Each end face of the sleeve 118 has a cylindrical ball race groove 121 therein in which are positioned a plurality of anti-friction balls 122.

Surrounding the rod 110 between the boss 82 and the adjacent end of the sleeve 118 I provide a plate 123 which the anti-friction balls 122 at that end of the sleeve engage. Surrounding the rod 110 between the head 108 of the plug 107 and the adjacent end of the sleeve 118 I provide a plate 124 which the anti-friction balls 122 at that end of the sleeve engage. The opposite face of the plate 124 is engaged by the plug head 108 which may be tightened against the plate 124 to maintain the correct pressure on the anti-friction balls at all times.

Surrounding the sleeve 118 I provide a circular housing 125 which has an operating arm 126 protruding therefrom. The housing 125 has an aperture 127 therein and the sleeve 118 has an aligned threaded aperture 128 therein. A screw 129 is positioned in the housing aperture 127 and in the threaded sleeve aperture 128 to secure the sleeve and the housing together.

From the foregoing it will be apparent that when the rod 110 is reciprocated the spiral keyways together with the splines 120 will rotate the sleeve 118 and the housing 125 about the axis of the rod 110.

To move the rod 110 towards the cylinder 85 the plug valve 96 is turned to the position shown in Figs. 10 and 11 wherein the valve port 98 directs fluid under pressure from the inlet 90 through the conduit 92 into the cylinder 84 whereupon the air or other fluid under pressure acting against the piston head 116 forces the rod 110 to move towards the cylinder 85. At the same time the valve port 99 communicates with the conduit 93 and the exhaust port 91 and the fluid in the cylinder 85 between the outer end thereof and the piston head 117 will be exhausted.

To move the rod 110 towards the piston 84 the plug valve 96 is moved to a position wherein the valve port 98 communicates with the conduit 92 and the exhaust port 91 and the valve port 99 communicates with the conduit 93 and the inlet 90.

From the foregoing description it will be apparent that I have provided a novel mechanical movement in the form of an operating member and means to actuate the same which is simple in construction and highly efficient in use.

Having thus described my invention I claim:

1. In a device of the class described, a support having a cylindrical bore, a rod mounted in said bore for reciprocating movement, means to prevent rotation of said rod, said means including diametrically opposed radial slots extending inwardly from the outside of said support, a key in each of said slots, said keys having inwardly projecting ends and said rod having straight axially extending peripheral keyways receiving the ends of said keys, means removably secured on the exterior of said support engaging said keys to prevent outward displacement thereof, said rod having spirally arranged outwardly opening keyways therein, a sleeve member having an internal bore and receiving said rod, said sleeve member having diametrically arranged radial slots therethrough, said slots being inclined at an angle to the axis of said sleeve, keys extending through the slots in said sleeve member, said keys having inner ends fitting the spiral keyways in said rod, a housing about said sleeve member and engaging the outer ends of said sleeve member keys to hold the latter in place, means to secure said housing to said sleeve member whereby the housing rotates with the sleeve, and an operating arm on said housing.

2. In a device of the class described, a base, a pair of spaced supports, said supports having axially aligned cylindrical bosses on the base, one of said bosses having a cylindrical aperture, the other boss having a threaded aperture, a plug in said threaded aperture, said plug having a cylindrical aperture coaxial with the first mentioned aperture, said apertures being of uniform diameter, a cylindrical rod mounted in said apertures for reciprocating movement, means to prevent rotation of said rod, said means including diametrically opposed radial slots extending through one of said supports, a key in each of said slots, means to retain said keys in said slots, said keys having inwardly projecting ends and said rod having straight axially extending peripheral keyways receiving the ends of said keys, said rod having spirally arranged outwardly opening keyways therein, a sleeve member having an internal bore, said sleeve member being disposed between said supports and receiving said rod, said sleeve member having diametrically arranged radial slots therethrough, keys extending through the slots in said sleeve member, said keys having inner ends fitting the tapered spiral keyways in said end, a housing about said sleeve member, said housing being adapted to retain said keys in position, and means to secure said housing to said sleeve whereby the housing rotates with the sleeve.

3. In a device of the class described, a pair of spaced supports, said supports having axially aligned cylindrical bores therein of uniform diameter, a cylindrical rod mounted in said bores for reciprocating movement, means to prevent rotation of said rod, said means including diametrically opposed radially extending slots through one of said supports, a key in each slot, said keys having inwardly projecting tapered ends and said rod having straight axially extending peripheral tapered keyways receiving the ends of said keys, said straight keyways extending in one direction to the end of said rod and extending in the opposite direction to points spaced inwardly from the other end of said rod, means removably secured to the exterior of said one support engaging said keys to prevent displacement thereof, said rod having spirally arranged outwardly opening tapered keyways therein, said spirally arranged keyways extending in one direction to the end of said rod and extending in the opposite direction to points spaced inwardly from the other end of said rod, a sleeve member having an internal bore, said sleeve member being disposed between said supports and receiving said rod, said sleeve member having diametrically arranged radial slots therethrough, said sleeve slots being inclined at an angle to the axis of said sleeve, keys extending through the slots in said sleeve member, said keys having tapered inner ends fitting the tapered spiral keyways in said rod, a housing about said sleeve member and engaging the outer ends of said sleeve member keys to hold the latter in place, means to secure said housing to said sleeve whereby the housing rotates with the sleeve, and an operating arm on said housing.

GEORGE E. BARNHART.